's Patent [19]

Ishida et al.

[11] 4,012,667
[45] Mar. 15, 1977

[54] PROTECTIVE DEVICE FOR SERIES CAPACITOR
[75] Inventors: Yotsuo Ishida, Chofu; Hiroshi Kuwahara, Amagasaki, both of Japan
[73] Assignees: Mitsubishi Denki Kabushiki Kaisha; The Tokyo Electric Power Co., Inc., both of Japan
[22] Filed: June 30, 1975
[21] Appl. No.: 591,395
[30] Foreign Application Priority Data
July 10, 1974 Japan .............. 49-79372
[52] U.S. Cl. .................. 361/16; 361/15
[51] Int. Cl.² ..................... H02H 7/16
[58] Field of Search ............ 317/12 A, 12 R
[56] References Cited
UNITED STATES PATENTS

| 2,207,577 | 7/1940 | Buell | 317/12 A |
| 2,664,525 | 12/1953 | Diebold | 317/12 A |
| 3,619,721 | 11/1971 | Westendorp | 317/12 A |
| 3,816,800 | 6/1974 | Ringler et al. | 317/12 A |

Primary Examiner—J D Miller
Assistant Examiner—Patrick R. Salce
Attorney, Agent, or Firm—Robert E. Burns; Emmanuel J. Lobato; Bruce L. Adams

[57] ABSTRACT

An overvoltage across each of N series capacitors is sensed by an individual overvoltage sensor through an associated current transformer and applied to a central control apparatus. Each capacitor is connected across an electric valve with a trigger electrode and also across a normally open circuit breaker. Another current transformer includes a secondary winding connected to the trigger valve electrode and a primary winding connected across a discharge circuit controlled by the central control apparatus. With an overvoltage developed across any capacitor, the discharge circuit discharges the electric valve and then closes the circuit breaker.

3 Claims, 2 Drawing Figures

PROTECTIVE DEVICE FOR SERIES CAPACITOR

BACKGROUND OF THE INVENTION

This invention relates to improvements in a protective device for protecting a series capacitor from an overvoltage.

Conventional protective devices for series capacitors have all the components of which they are comprised at the same potential as associated electric power systems resulting in the disadvantage that the operation of maintenance is impossible to be performed. Also one overvoltage sensor unit has been provided for each of the series capacitors. Thus the occurrence of an electrical or a mechanical fault on any of components forming the protective device has led to the destruction of the associated capacitor.

Accordingly it is an object of the present invention to provide a new and improved protective device for a series capacitor including a current transformer for electrically isolating a ground potential portion from a high potential portion, the ground potential portion being provided with components requiring maintenance, the high potential portion having disposed thereon only a minimum number of components high in reliability whereby those components low in surge resisting property are prevented from being destroyed while facilitating the maintenance thereof.

SUMMARY OF THE INVENTION

The present invention provides a protective device for a series capacitor comprising, in combination, a series capacitor, an electric valve connected across the series capacitor and including a trigger electrode, first current transformer means for sensing a current flowing through the series capacitor, an overvoltage sensor circuit responsive to an output from the first current transformer means in excess of a predetermined magnitude to deliver a signal, and second transformer means having a secondary side connected to the trigger electrode of the electric valve, the second current transformer means responding to the signal from the overvoltage sensor circuit to be energized and electrically isolating a low potential portion including the overvoltage sensor circuit from a high potential portion including the series capacitor and the electric valve.

Preferably the electric valve may be formed of electric discharge gap means and a normally open circuit breaker is connected across the electric discharge gap means and operative to be closed at the end of a predetermined time interval after the electric discharge gap means is discharged.

BRIEF DESCRIPTION OF THE DRAWINGS

The present invention will become more readily apparent from the following detailed description taken in conjunction with the accompanying drawings in which.

DESCRIPTION OF THE PREFERRED EMBODIMENT

Figure 1:
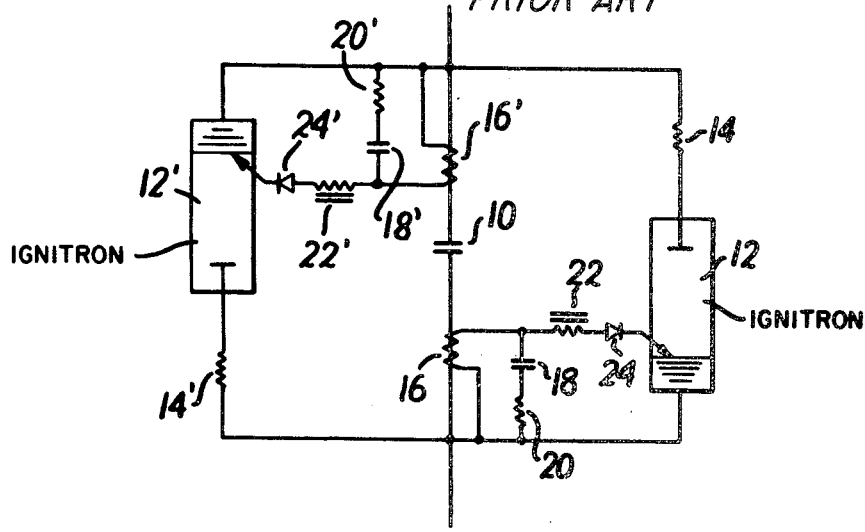
FIG. 1 is a circuit diagram of a conventional device for protecting a series capacitor.

Referring now to FIG. 1 of the drawings, it is seen that an arrangement disclosed herein comprises a protected capacitor 10 connected in one line of an electric power system and an electric valve shown as being an ignitron 12 connected across the protected capacitor 10 through a stabilizing resistor 14. The resistor 14 is connected at one end to the anode electrode of the ignitron 12 and at the other end to one side, in this case, the upper side as viewed in FIG. 1 of the protected capacitor 10. The ignitron 12 has its mercury pool cathode electrode connected to the other or lower side of the capacitor 10 and a current transformer 16 is electrically coupled to the line of the system adjacent the lower side of the capacitor 10 to sense a current flowing through the protected capacitor 10. The current transformer 16 has a secondary side connected at one end to an electric conductor led to the cathode electrode of the ignitron 12 and having connected thereacross a series combination of a capacitor 18 and a resistor 20 forming a secondary load thereof. The capacitor 18 is connected to the ignitron 12 at the starting igniter through a saturable reactor 22 and a semiconductor diode 24 serving to block a reverse current.

All the components as above described are shown to the right of the protected capacitor 10 as viewed in FIG. 1 to form a protective portion for the forward polarity of the system voltage.

FIG. 1 also shows the component identical and interconnected in the similar manner to the components as above described for the left of the protected capacitor 10 as viewed in FIG. 1 to form a protective portion for the reverse polarity of the system voltage. Those components are designated by like reference numerals with the prime denoting the identical components of the protective portion for the forward polarity.

Upon a current due to a fault in the system flowing through the capacitor 10, a voltage thereacross is initiated to abnormally increase. This increase in voltage causes an increase in secondary current flowing through the current transformer 16 and therefore in a voltage across the series combination of capacitor 18 and resistor 20.

Assuming that the voltage across the series combination of capacitor 18 and resistor 20 is forward in polarity with respect to the associated diode 24, the full voltage across that series combination is applied to the saturable reactor 22. When that full voltage has its voltage-time product exceeding a predetermined value, that is to say, when the capacitor reaches a maximum value of the applied voltage, the saturable reactor 22 becomes saturated. This cause a secondary current from the current transformer sufficient to ignite the ignitron 12 to flow through the diode 24 into the igniter of the ignitron 12. Therefore the ingitron 12 is ignited to permit a charge on the protected capacitor 10 to discharge through the stabilizing resistor 14 while at the same time the fault current through the system is bypassed from the capacitor whereby the protected capacitor is protected against being destroyed due to overvoltage.

If the voltage across the series combination of capacitor 18 and resistor 20 is reversed in polarity from the associated diode 24 then the components shown to the left to the protected capacitor 10 as viewed in FIG. 1 are similarly operated resulting in the protection of the capacitor 10 against the reversed overvoltage.

Conventional devices for protecting the series capacitor such as shown in FIG. 1 have been disadvantageous in the following respects:

1. Since all the components forming the protective device, for example, the components 12 through 24 as shown in FIG. 1 are put at a high potential equal to that of the associated electric system, the operation of maintenance is impossible to perform. This is the fatal disadvantage for electric power systems required to be high in reliability.

Particularly due to the use of static state circuit elements such as semiconductor elements on the high potential portion of the protective device it has been very difficult to protect those elements against breaking because the surge voltage and current withstood by the elements are low.

2. Since one means for sensing an overvoltage should be provided for each of the protected capacitors, the occurrence of an electrical or a mechanical fault on any of elements forming the overvoltage sensing means would lead to the destruction of the associated series capacitor.

The present invention contemplates to eliminate the disadvantages of the prior art practice as above described by the provision of a protective device for protecting series capacitors, stable in operation and high in reliability.

Figure 2:
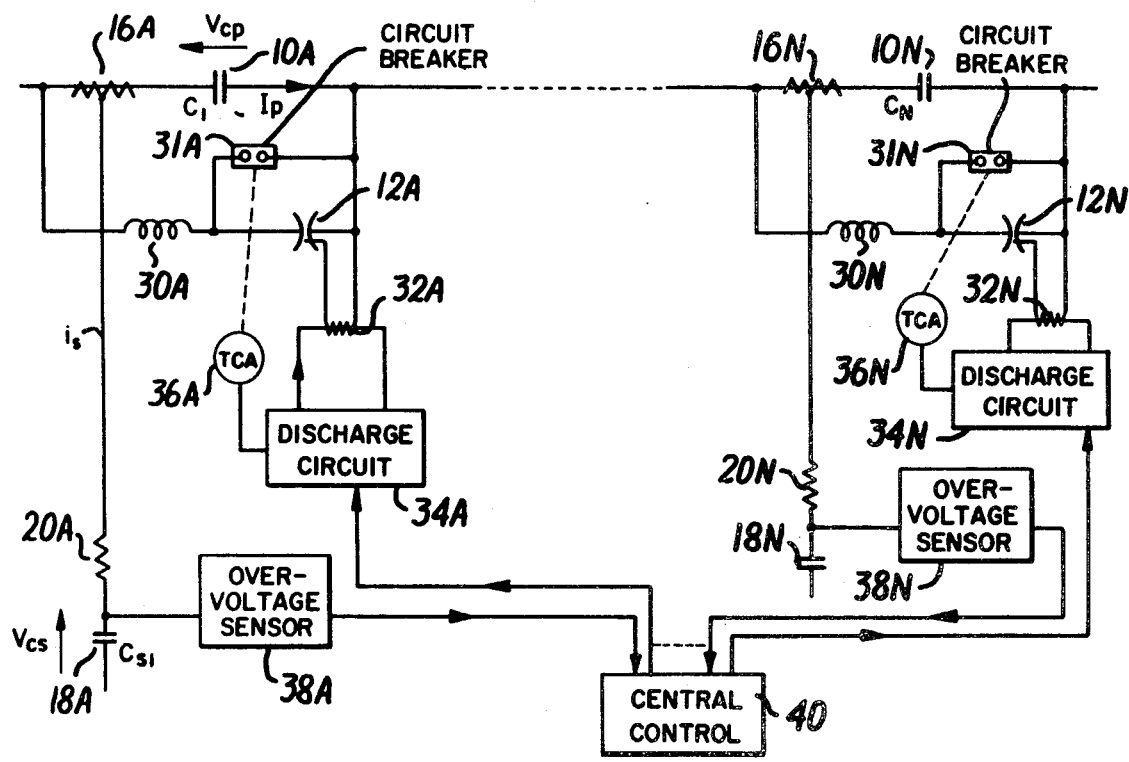
FIG. 2 is a combined circuit and block diagram of a protective device for series capacitors constructed in accordance with the principles of the present invention.

Referring now to FIG. 2, there is illustrated a protective device for protecting series capacitors constructed in accordance with the principles of the present invention.

When electric power systems in which the series capacitor is to be disposed are high in capability, it has been commonly practiced to compose the series capacitor of a multitude of unit capacitors interconnected in series-parallel circuit relationship. Thus any electric station where a series capacitor is to be installed has disposed therein any desired number of groups into which the required number of unit capacitors are divided and, one capacitor protecting device is provided for each group of unit capacitors.

In FIG. 2, N groups of protected capacitors 10A – 10N are shown as being serially interconnected and operatively connected to respective protective devices identical in construction to one another. The reference characters A – N added as the suffix, to the reference numerals have been employed to identify the groups of the protected capacitors. For example, the reference numerals with the suffix "A" designates the components operatively coupled to the capacitor group 10A. As above described, the respective protective devices for the protected capacitor groups 10A – 10N are of the same construction and only one for the capacitor group 10A will now be described by using the reference numerals without the suffix A unless it is required to add the suffix to the reference numerals.

As shown in FIG. 2, a current transformer 16A is operatively connected to an electrical conductor having the N capacitor groups 10A, – 10N serially interconnected therein to sense a capacitor current and has a secondary winding connected across a series combination of a resistor 20 and a capacitor 18, a secondary load for the transformer 16. Although the resistor 20 and the capacitor 18 are shown in FIG. 2 as being connected to the secondary winding of the transformer 16 through a single line. An electric valve or electron tube 12 with a trigger electrode, for example, a discharge gap device and a reactor 30 are serially connected across the series capacitor group 10.

Then a normally open circuit breaker 31 is connected across the electric valve 12 and a trigger current transformer 32 includes a secondary winding connected across the trigger electrode and one of the main electrodes of the electric valve 12 and a primary winding forming an electrical conductor connected across a current discharge circuit 34. The discharging circuit 34 is connected to a closing coil 36 for the circuit breaker 30. The junction of the resistor and capacitor 20 and 18 respectively is connected to an overvoltage sensor circuit 38 subsequently connected to a single central control apparatus 40. The central control apparatus 40 is connected to all the current discharge circuits 34A – 34N.

The operation of the arrangement as shown in FIG. 2 will now be described. First consider the operation of sensing an overvoltage across the capacitor. This overvoltage sensing operation is advantageous in that a voltage can be sensed with a high accuracy and that the maintenance of the voltage sensing portion can be made easily and completely because the voltage sensing portion is put at a ground potential while it is full isolated from the higher potential portion by means of the current transformer 32. Further since each of the capacitor groups can be protected in accordance with information concerning an overvoltage or overvoltages across one or more of the other capacitor groups and supplied by the central control apparatus 40, the overvoltage sensor circuit for each of the capacitor groups is high in ability to endure faults resulting in an additional increase in reliability.

In the arrangement of FIG. 2 it is assumed that the capacitor 10 has a capacitance $C_1$, a current $I_p$ flowing thereinto and a voltage of $V_{CP}$ thereacross, the current transformer 16 has a turn ratio of K and has a secondary current of $i_s$ flowing through its secondary winding, and the load capacitor 18 has a capacitance of $C_{S1}$ and a voltage $V_{CS}$ thereacross. Under the assumed condition the $V_{CP}$ and $V_{CS}$ are expressed respectively by:

$$V_{CP} = 1/C_1 \int I_p dt \qquad (1)$$

and $$V_{CS} = 1/C_{s1} \int i_s dt \qquad (2)$$

Since $I_P = K i_s$ is held, the equation (1) is deduced to $$V_{cp} = 1/C_1 \int K\, i_s\, dt = KC_{s1}/C_1\, V_{cs} \text{ in volts} \qquad (3)$$

From the equation (3) it is seen that the voltage $V_{CP}$ across the capacitor 10 can readily be sensed by measuring the voltage $V_{CS}$ across the load capacitor 18.

Under these circumstances, the voltage $V_{CS}$ across the capacitor 18 can be compared with a predetermined reference voltage of $V_{ref}$ by the overvoltage sensor circuit 38. If the voltage $V_{CS}$ is higher than the voltage $V_{ref}$ as determined by the sensor circuit 38 then the latter immediately supplies a pulse having a predetermined fixed duration to the central control apparatus 40.

The process as above described is repeated by each of the overvoltage sensor circuits of the groups A – N. The central control apparatus 40 performs the OR operation with respect to the pulses supplied thereto from the respective sensor circuits 38A – 38N and then transmits an output therefrom to all the current discharge circuits 34A – 34N. Thus the discharge circuits 34 responds to the output from the central control apparatus 40.

From the foregoing it will be appreciated that the sensing of an overvoltage across any one of the capacitor groups leads to the transmission of a command for the protection of the capacitor to all the current discharge circuits 34A – 34N. In other words, each of the protected capacitor groups is protected and monitored by all the N overvoltage sensor circuits.

When the command for the protection of the capacitor is received from the central control apparatus 40, each of the current discharge circuits 34A – 34N supplies a high current of high frequency to the primary circuit of the associated trigger current transformer 32. As the current transformer 32 includes its secondary circuit connected to the trigger electrode of the electric valve 12 as above described and has an impedance normally infinitely high, all the high frequency current supplied to the primary circuit of the current transformer 32 serves as a current for exciting the transformer 32 resulting in the induction of a very high voltage across the secondary circuit thereof whose magnitude is normally of several tens of a kilovolt.

That high voltage is applied to the trigger electrode of the electric valve 12 to strike an electric discharge across both main electrodes of the valve 12 across which the associated capacitor groups 10 is connected. This discharge across the electric valve 12 causes an electrical charge on the capacitor group 10 to discharge through the electric valve 12 and the reactor 30 while the discharge current is limited by the reactor 30. Simultaneously the particular fault current is bypassed from the capacitor group 10 ensuring that the capacitor group 10 is protected from the destruction due to the overvoltage.

Simultaneously with the supply of the current to the primary circuit of the trigger current transformer 32, the discharge circuit 34 energizes the closing coil 36 for the circuit breaker 30. Thus the circuit breaker 30 is closed within several tens of a millisecond after the discharge across the electric valve 12.

Therefore the electric valve 12 is bypassed by the now closed circuit breaker 31 with the result that the circuit breaker 31 takes over the flow of fault current.

Upon the fault current disappearing, the circuit breaker is returned back to its open position to put the arrangement of FIG. 2 in readiness for the suceeding fault.

The present invention has several advantages. For example, since all the control functions performed as the protective device are put on the ground potential portion electrically isolated from high potential portion by means of the trigger current transformer 32, it is possible to effect the inspection and maintenance of the ground potential portion resulting in a high reliability. Due to the presence of the control unit at ground potential, a high degree control circuit can be used resulting in the stable protection with a high accuracy. Further the maintenance is scarcely required because the high potential portion is composed of stable components previously employed.

While the present invention has been illustrated and described in conjunction with a single preferred embodiment thereof it is to be understood that numerous changes and modifications may be resorted to without departing from the spirit and scope of the present invention.

What is claimed is:

1. A protective device for a series capacitor comprising, in combination, a series capacitor, first current transformer means connected in series with said capacitor for sensing a current flowing through said series capacitor, an electric valve electrically connected in parallel with the series combination of said series capacitor and said first current transformer means and including a trigger electrode, a normally open circuit breaker energizable to close and electrically connected in parallel with said electric valve, an overvoltage sensor circuit responsive to an output from said first current transformer means in excess of a predetermined magnitude to deliver a signal, and second current transformer means having a secondary side connected to said trigger electrode of said electric valve, said second current transformer means being responsive to said signal from said overvoltage sensor circuit to simultaneously energize said electric valve to conduct and said circuit breaker to close to bypass said series capacitor and to electrically isolate a low potential portion of the protective device including said overvoltage sensor circuit from a high potential portion of the protective device including said series capacitor and said electric valve.

2. In combination: a capacitor; a first current transformer electrically connected in series with said capacitor for sensing the flow of current through said capacitor; a normally non-conductive electron tube including a trigger electrode for receiving a triggering signal to render said electron tube conductive; a normally open circuit breaker including means electrically energizable for closing the same and for maintaining it closed as long as a current is flowing therethrough; means electrically connecting said electron tube and said circuit breaker in parallel and electrically connecting the parallel combination of said electron tube and said circuit breaker in parallel with the series combination of said first current transformer and said capacitor to provide a conductive path to by pass said first current transformer and said capacitor when said circuit breaker is closed or when said electron tube is conductive; and means coactive with said first current transformer and responsive to the current sensed by said first current transformer for simultaneously applying a trigger signal to said trigger electrode and for energizing said circuit breaker when the current sensed by said first current transformer exceeds a certain value in order to render said electron tube conductive and to close said circuit breaker to bypass said capacitor and prevent an excessive voltage from being developed thereacross, said means including an output second current transformer having a secondary winding connected to apply the signal to said trigger electrode and to isolate said electron tube from the rest of said means for applying a trigger signal and for energizing said circuit breaker.

3. In combination: a plurality of capacitors electrically connected in series; sensor means for sensing currents flowing through individual ones of said capacitors; bypass means energizable for bypassing individual ones of said capacitors by providing a conductive path in parallel with each of said capacitors, said bypass means comprising a plurality of normally non-conductive electron tubes each including a trigger electrode and each connected in parallel with a respective one of said capacitors, and a plurality of normally open circuit breakers each energizable to close and each connected in parallel with a respective one of said capacitors; and means coactive with said sensor means and responsive to the sensed currents flowing through individual ones of said capacitors for simultaneously energizing all of said circuit breakers to close and for simultaneously applying a trigger signal to all of said trigger electrodes to render said plurality of electron tubes conductive when the sensed current flowing through any one of said capacitors exceeds a certain value in order to bypass all of said capacitors with a conductive path.

* * * * *